United States Patent Office.

CHARLES C. BARTLETT, OF NEW BRIGHTON, NEW YORK, ASSIGNOR TO THE ORFORD COPPER COMPANY, OF NEW JERSEY.

PROCESS OF PRODUCING AND SEPARATING SULPHIDE OF NICKEL FROM ORES CONTAINING NICKEL.

SPECIFICATION forming part of Letters Patent No. 499,314, dated June 13, 1893.

Application filed May 4, 1891. Serial No. 391,534. (No specimens.)

*To all whom it may concern:*

Be it known that I, CHARLES C. BARTLETT, a subject of the Queen of Great Britain, and a resident of New Brighton, Richmond county, and State of New York, have invented a certain new and useful Improvement in Processes of Producing and Separating Sulphide of Nickel from Ores Containing Nickel, of which the following is a specification.

My invention relates to an improvement in separation of nickel, in the form of sulphides or other salts, from the salts of copper, as they exist either in the ores produced from certain localities or the products of the various operations of copper smelting, by means of the use of certain chemical re-agents which combine when smelted with the copper to produce a very liquid matte, which is of less specific gravity than the nickel in the mass, and which when tapped from the furnace into any convenient form of receptacle will rise to the top, and form a layer, above the nickel, which may be readily separated by mechanical means, upon cooling. This operation may take place in either a shaft or a reverberatory furnace as may be found most convenient, and economical.

Now I have discovered that when such ores, and mattes, are mixed with ordinary niter cake, as produced from the manufacture of sulphuric acid or with the salt cake of commerce, preferably containing an excess of free sulphuric acid, or with nitrates or carbonates of the alkaline bases, or a mixture of two or more of the same, so as to form a flux, and are smelted as above set forth a very fluid matte of very light specific gravity, will be produced which will contain practically all of the copper contained in the ore or mattes, while the nickel will remain in the form of sulphides in a mass by itself, and being of greater specific gravity than the rest of the mass will, when the smelted mass is tapped from the furnace, settle to the bottom of any vessel in which the mass is collected. The portion which settles to the bottom of the mass will be found to consist largely of sulphide of nickel, while the copper, iron and other metals originally existing in the nickel in the ores and mattes, will be converted into sulphides and rise to the top of the mass.

The former are technically known as "bottoms" and the latter as "tops." Any one or more of these reagents are added to the copper ore or matte in the proportion preferably of one part of reagent to two parts of copper ore or matte to be treated, thoroughly mixed therewith and brought to the fusion point in the furnace, and then tapped out and allowed to cool. When cool the mass is broken up and the layers are separated by hand and the nickel mattes which will be found upon the bottom subjected to further treatment if desired. Or the separation may be effected while the mass is still liquid by allowing it to settle and then siphoning or pouring off the upper layer or top in any convenient manner, as the bottoms solidify much more rapidly than the upper layers. The treatment may be repeated from time to time as may be necessary, with one or more of the above named reagents, until all or practically all of the copper has been separated from the nickel, at which time the copper slag may be treated for metallic copper by any desired method.

In each case the bottoms, rich in sulphide of nickel resultant from the first treatment with the flux, are subjected to a further smelting in the same way, and as a result of each settling and separation, the impurities will be eliminated from the "bottoms," until finally a "bottom" is produced which consists practically of pure sulphide of nickel. This may be sold as such or may be converted into metallic nickel or into nickel oxide, in any convenient manner.

I claim as my invention—

1. The hereinbefore described method of producing and separating sulphide of nickel, consisting in smelting the ores, mattes, or other bodies containing nickel with a flux composed of niter cake, salt cake, nitrates or carbonates of alkaline bases, or a mixture of two or more of the same, substantially as described, whereby sulphide of nickel is formed, which is of greater specific gravity than the remainder of the mass and settles to the bottom of the same, while the copper, iron and salts of other metals rise to the top and may be separated in any convenient manner.

2. The hereinbefore described method of producing sulphide of nickel, consisting in smelting the ores, mattes or other substances containing nickel with a flux composed of niter cake, salt cake, nitrates or carbonates alkaline bases or a mixture of two or more of the same, substantially as described, in separating out the sulphide of nickel resultant from the operation from the smelted mass, and in re-smelting the bottoms rich in sulphide of nickel with the same or substantially the same flux, and separating the resultant sulphide of nickel from the sulphides of the other metals present, and in repeating the operation until a commercially pure residue of sulphide of nickel is obtained.

3. The hereinbefore described method of producing and separating sulphide of nickel, consisting in smelting the ores, mattes or other substances containing nickel, with a flux composed of niter cake, salt cake, nitrates or carbonates of alkaline bases, or a mixture of two or more of the same, substantially as described, in separating out the bottoms rich in sulphide of nickel resultant from the separation, by specific gravity, and in subjecting the separated bottoms to repeated smelting with the same or substantially the same flux, and subsequent separation by specific gravity, until a commercially pure residue of sulphide of nickel is produced.

In testimony that I claim the foregoing as my invention I have signed my name, in presence of two witnesses, this 2d day of May, 1891.

CHARLES C. BARTLETT.

Witnesses:
 WILLARD PARKER BUTLER,
 JOHN L. THOMSON.